United States Patent [19]

Erlbruch

[11] Patent Number: 4,995,861
[45] Date of Patent: Feb. 26, 1991

[54] MECHANICAL SHIFTABLE THREE SPEED PLANETARY TRANSMISSION

[75] Inventor: Peter Erlbruch, Herdecke, Fed. Rep. of Germany

[73] Assignee: Mannesman Aktiengesellschaft, Düsseldorf, Fed. Rep. of Germany

[21] Appl. No.: 453,317

[22] Filed: Dec. 21, 1989

[30] Foreign Application Priority Data

Dec. 23, 1988 [DE] Fed. Rep. of Germany ....... 3844166

[51] Int. Cl.$^5$ ............................ F16H 1/46; F16H 3/54
[52] U.S. Cl. .................................... 475/298; 475/300; 475/145; 475/269
[58] Field of Search ............... 475/298, 300, 331, 269, 475/116, 145

[56] References Cited

U.S. PATENT DOCUMENTS

| 1,479,292 | 1/1924 | Farley | 475/296 |
| 1,640,628 | 8/1927 | Thorley | 475/296 |
| 2,810,304 | 10/1957 | Ball | 475/145 X |
| 3,055,237 | 9/1962 | Magnuson | 475/296 |
| 3,460,807 | 8/1969 | Prikhodko et al. | 475/269 X |
| 4,440,042 | 4/1984 | Holdeman | 475/269 |
| 4,617,837 | 10/1986 | Kataoka et al. | 475/298 X |

FOREIGN PATENT DOCUMENTS 249747 4/1926 United Kingdom ............... 475/145

Primary Examiner—Leslie A. Braun
Assistant Examiner—Khoi Q. Ta
Attorney, Agent, or Firm—Nils H. Ljungman & Associates

[57] ABSTRACT

A compact gearing arrangement in a transmission which can be shifted accurately with simple components and where strain on the step-down gearing components by high centrifical forces is largely avoided.

10 Claims, 3 Drawing Sheets

MECHANICAL SHIFTABLE THREE SPEED PLANETARY TRANSMISSION

BACKGROUND OF THE INVENTION

1. Field of the Invention

The invention relates to a mechanically shiftable three speed planetary gearing unit or transmission. 2. Description of the Prior Art A two stage planetary gearing with step-down gearing is known from German Patent Publication Published for Opposition Purposes No. 22 51 299 where a coupling sleeve, which is toothed on the inside and outside, is used in a sliding manner. The step-down gearing components of this gearing known from the above-mentioned patent remain engaged or meshed in the shift stage with direct penetration. The step-down gearing components continue to run on idle in this shift step. The result of this is an increase in the wear and tear factor of the toothing and the bearings of the planetary gearings. Additionally, the revolutions per minute of the driving shaft are limited by kinematic conditions of the step-down gearing.

OBJECT OF THE INVENTION

The known gearing shows a step-down gear in its drive which, consists of a spur gear. The output shaft is attached parallel to the axis and staggered with the input driving shaft. Altogether, through this, the gearing has been designed with a large volume. It is the intent of the invention to develop a compact gearing arrangement in a transmission which can be shifted accurately with simple components and where strain on the step-down gearing components by high centrifugal forces is largely avoided.

SUMMARY OF THE INVENTION

In the solution, according to the invention, an output shaft is located at the same axis as the driving shaft or input in the mechanically shiftable three speed planetary gearing unit or transmission. An external toothing of gears is attached to the driving shaft or input which engages with the axially slidable gear shift sleeve. The driving shaft or input is axially slidable by means of a shifting mechanism. Step type planetary gear wheels of different diameters are fastened to the pinion cage whereby the planetary gears, pointing away from the gear shift sleeve, have a smaller diameter. The planetary gears brace themselves against an internal toothing of gears and the pinion cage mesh together with a sun gear ring or ring gear which has an internal toothing of gears with which the toothing of the central wheel can be meshed.

The three speed planetary gear unit or transmission displays a closed housing which is suitable for the operating space of the gear units. Both ends of the driving shaft and output shaft are located on the same axis and protrude typically from the housing. According to the invention, the gear shift sleeve, which slides on the output shaft, and the driving shaft are axially movable. In a direct gear, the driving shaft and the output shaft can be coupled directly. In that shift step, the step-down gearing of the planetary gearing does not have an effect. A limitation of the input revolutions per minute of the driving shaft is not applicable. Such a limitation is necessary for the step-down gearing, elements which run in the direct gearing step because a higher revolution per minute would expose the driving shaft and especially the bearing of the planetary gears to higher centrifugal forces which could lead to a high wear factor and could lead to an ultimate destruction of the bearing elements.

Through the possibility of the meshing of the planetary gear step during a direct drive, this step can often evenly distribute the load factor. This holds true especially for the bearings of the planetary gears, that is relating to the stress or strain regarding the force, revolutions per minute, and the mesh timing. Furthermore, a reduced wear and tear factor of the mesh surfaces of the toothed gears as well as a reduction in the loss of idle motion, can often be accomplished even at the resting position.

While the gear shift sleeve and the pinion cage do not mesh in a direct gear, the gear shift sleeve is connected through the pinion cage in a form locking fashion for the remainder of the shift steps. For this, shifting a shift cylinder is being planned with clearly defined shift positions which can be addressed and repeated. The control of the shift cylinder is logically connected to the rest of the shifting steps. The shifting cylinder for the shift steps of the step-down gearing is bodily connected to the shift cylinder which acts upon the gear shift sleeve. In relation to control and adjustment, the shift cylinder touches down at the precise retracted spot at which the planetary web and gear shift sleeve are solidly meshed. The various steps of the step-down gearing or reduction gear are achieved with a sun gear ring or outer ring gear with the constant dimension of the central wheel or sun gear where an internal toothing of gears of the central wheel or sun gear and a smaller planetary gear meshes with the external toothing of gears.

The three speed planetary gear unit, according to the invention, distinguishes itself through the high space concentrated and co-axial embodiment. By means of various gearing combinations at the planetary output area, high total ratios can be realized.

One aspect of the invention resides broadly in a mechanically shiftable three speed planetary gear transmission comprising a housing, a driving shaft extending from the housing having a head thereon within the housing, a central toothed sun gear attached to the head of the driving shaft, an opposed spaced output shaft coaxial with the driving shaft, an output shaft having external gear teeth provided thereon within the housing, a gear shift sleeve having gear teeth that are axially slideably engageable with the external gear teeth of the output shaft, a shift device protruding from the housing and locked to the driving shaft for axially moving the driving shaft and engaged with the gear shift sleeve for sliding the same, a pinion cage containing variable planetary gears having different diameters and an internal toothed ring gear in the housing with which the planetary gears mesh, and an outer sun gear ring having external toothing engageable with the planetary gears and the internal toothing engageable with the central toothed sun gear.

Another aspect of the invention resides broadly in a mechanically shiftable three speed planetary gear transmission comprising a housing, a driving shaft extending from the housing having a peripheral slot therein and head thereon within the housing, a central toothed sun gear attached to the head of the driving shaft, an opposed spaced output shaft coaxial with the driving shaft, the output shaft external gear teeth provided thereon within the housing, a gear shift sleeve having gear teeth and a peripheral slot therein, axially slideably engageable with the external gear teeth of the output shaft, a shift device protruding from the housing, including adjustable piston cylinder units, having a shift linkage, which engages with the peripheral slot in the driving shaft and the peripheral slot in the shift sleeve for axially slideably moving of the same, a pinion cage containing variable planetary gears having different diameters, an internal toothed ring gear in the housing with which the planetary gears mesh, and an outer sun gear ring having external toothing engageable with the planetary gears and internal toothing engageable with the central toothed sun gear.

BRIEF DESCRIPTION OF THE DRAWINGS

One embodiment of the gear unit [transmission] is shown in the following figures. It is shown.

DESCRIPTION OF THE PREFERRED EMBODIMENTS

Figure 1:
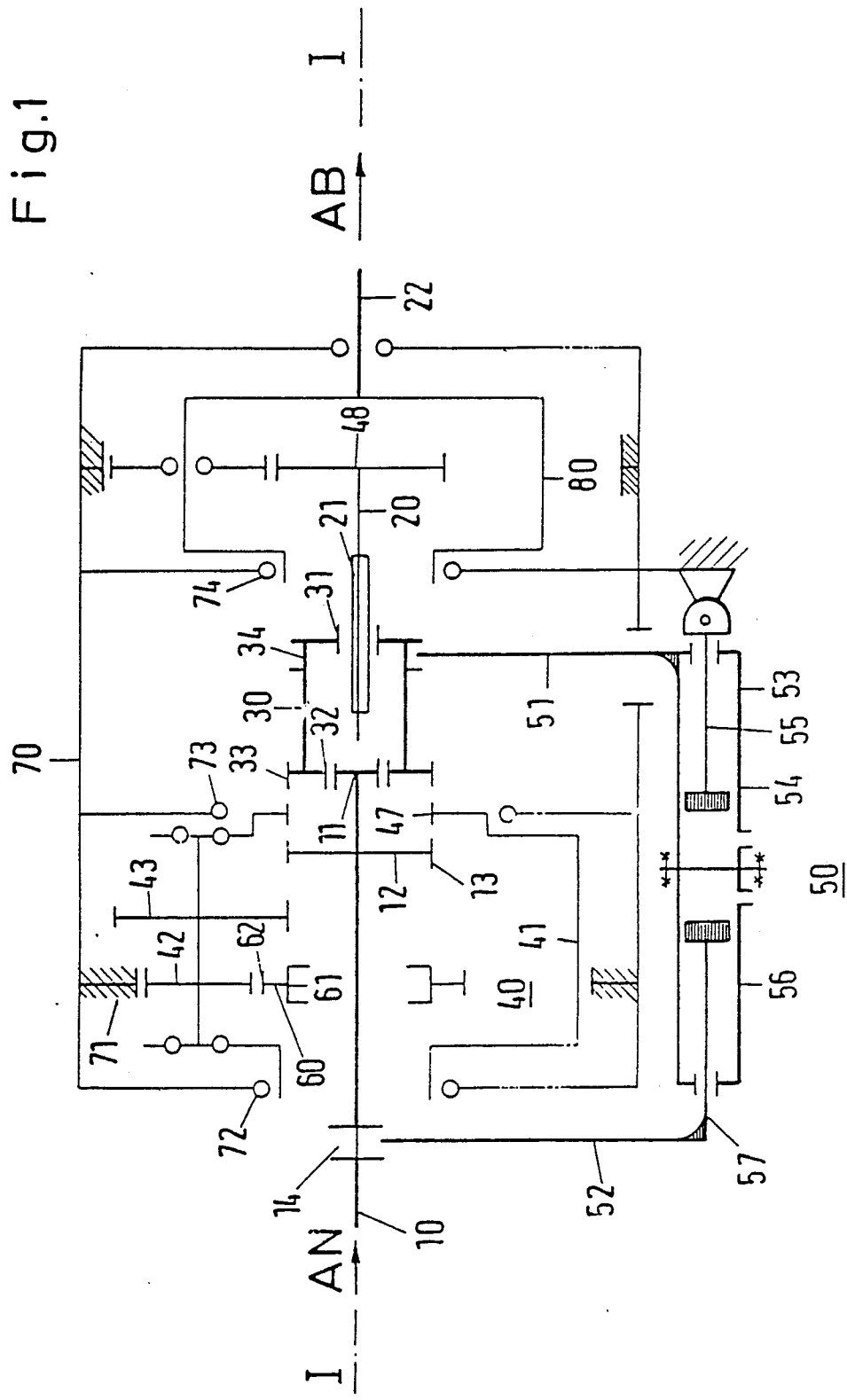
FIG. 1 schematics of a direct gear ratio,
FIG. 2 schematics of a high gear ratio and
FIG. 3 schematics of a mid-range gear ratio.
Figure 2:
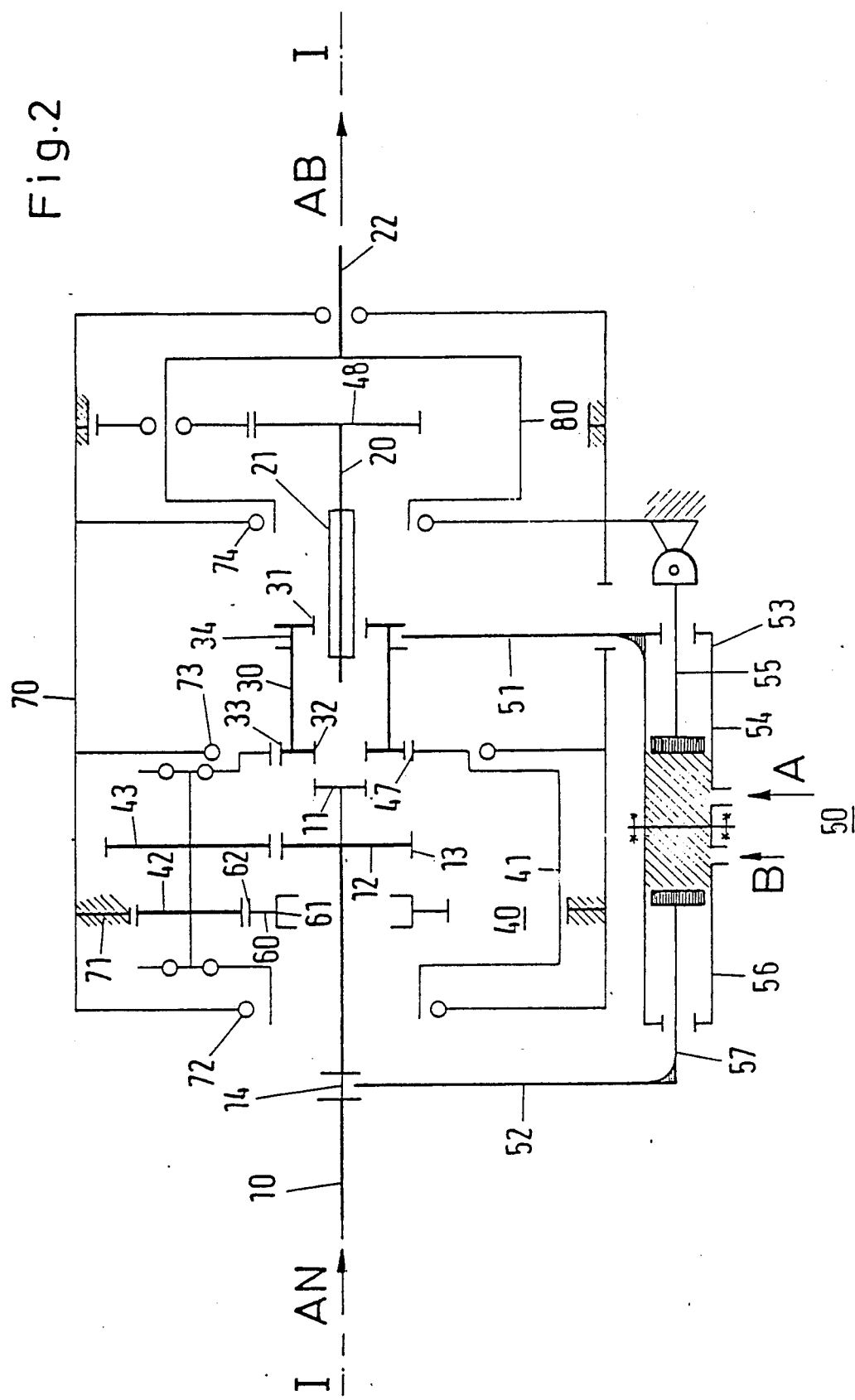
Figure 3:
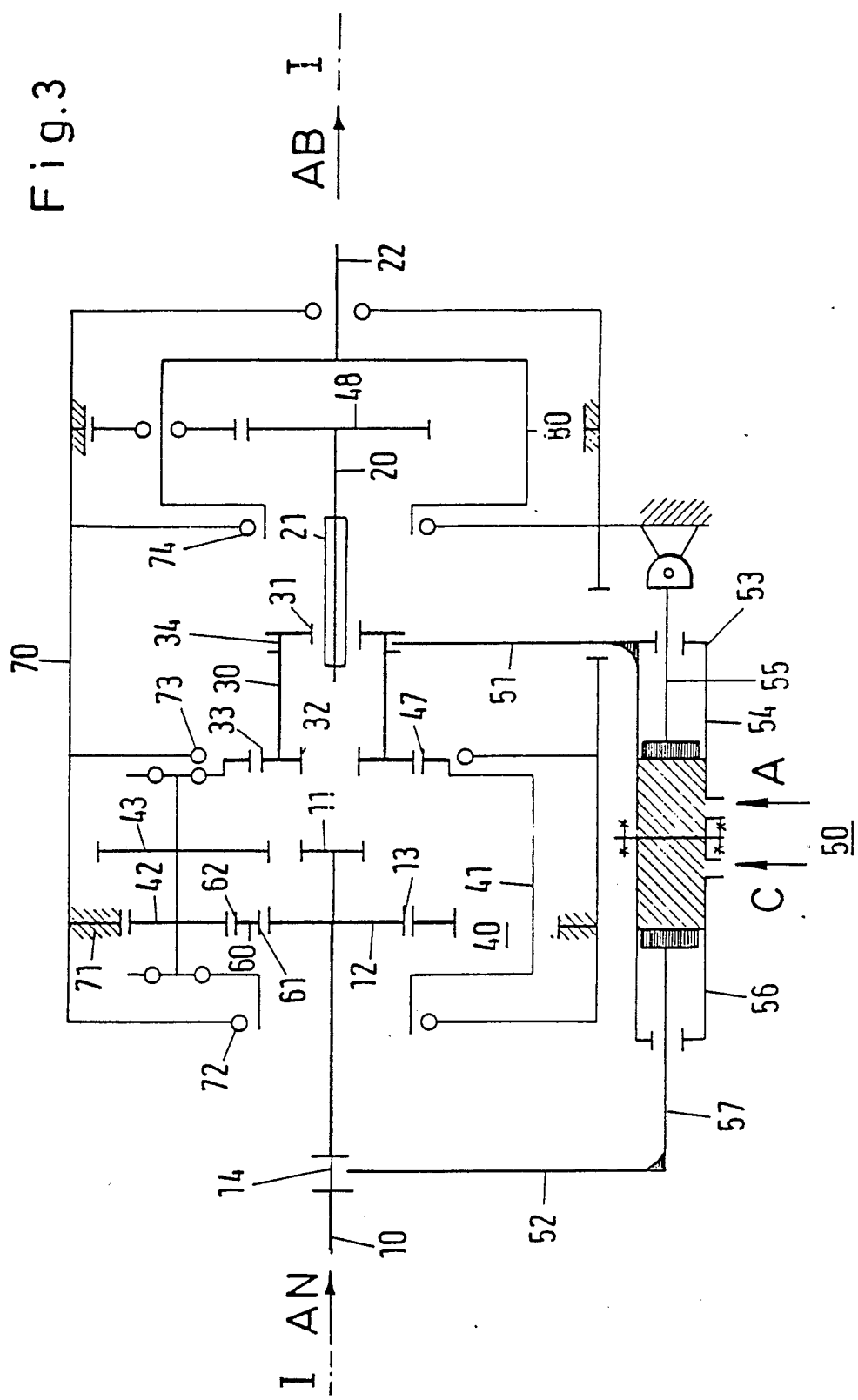

The position identifications for all three figures are identical. The reference numerals of one of the figures also denote the same components in the other figures. Also, in the event that the reference numerals are not indicated in one of the figures, these components are identical to those in the other figures. In FIGS. 1 through 3, the driving shaft 10 and the output shaft 20 are mounted on the same axis I. Peripheral slot or key way 14 is mounted on driving shaft 10 in which the peripheral slot is gripped or seized by shift fork linkage 52. Clutch interlock 11 is located at the head of driving shaft 10. Central gear or sun gear 12 has toothed gear 13 and is attached between clutch interlock 11 and peripheral slot 14.

Output shaft 20 has an external toothing of gears 21. External toothing of gears 21 is in a form locking way connected to an internal toothing of gears 31 and shift sleeve 30. On the side of shift sleeve 30, which is pointed towards the driving shaft, there is an internal toothing of gears 32 and an external toothing of gears 33. Shift sleeve 30 furthermore, has a peripheral slot 34 into which shift fork linkage 51 reaches.

Planetary gearing 40 is surrounded by housing 70 which has on its driving side a bearing flange 72 and on its output side there is bearing flange 73 in which pinion cage 41 is situated. Pinion cage 41 shows planetary gears 42 and 43 whereby planetary gears 42 are of the smaller diameter. Sun gear 60 has an internal toothing of gears 61 and an external toothing of gears 62 and can be meshed with planetary gears 42.

Planetary pinion cage 41 has an internal toothing of gears 47 which is located towards the side of the output shaft and which internal toothing of gears 47 can be brought into contact with the external toothing of gears 33 of the gear shift sleeve 30. Driving shaft 10 and gear shift sleeve 30 can be moved by means of a shifting apparatus 50. Shifting apparatus 50 consists of a shifting device 53 which is made up from piston cylinder units 54, 55 and 56, 57. Piston rod at 55 is attached to housing 70 in a pivoting manner. Attached to cylinder 54 is shift fork rod 51 which shifts gear shift sleeve 30. Shift fork rods 52 which shifts the driving shaft is attached to piston rod 57. An additional step-down gearing or reduction gear 80, which has the exit shaft 22, can be added to output shaft 20. In this case, the step-down gearing can be located in housing 70. A bearing 74 for the output is located in housing 70.

In FIG. 1, the direct gear ratio is illustrated. The shifting device 53 is without pressure from the side of the piston. During the direct gear ratio, the flow of forces is guided via the clutch gear tooth 11 of the driving shaft 10 and then to the internal toothing of gears 32 to the gear shift sleeve 30 and further to the internal toothing of gears 31 and the external toothing of gears 21 to the output shaft 20.

FIG. 2 shows the high gear ratio. In shift step A, typically when pressure is introduced in the direction of the arrow A into the cylinder 54 which may then move the piston disposed in the cylinder 54, the cylinder 54 moves in the direction of the input and in the process picks up shift fork rods 51 in the same direction. The shift fork rods 52 move the gear shift sleeve 30 and meshes the external toothing of gears 33 with the internal toothing of gears 47 of the pinion cage 41. Simultaneously, piston cylinder units 56, 57 are being impacted with pressure in the shift step B where pressure enters in the direction of the arrow B into the cylinder 56 to move the piston in cylinder 56. Piston rod 57 moves the shift fork rods 52 and act via the peripheral slot 14 upon the driving shaft 10. Sun gear 12 which is located on driving shaft 10 is moved in such a fashion that the toothing of gear 13 is meshed with the large planetary gear 43.

During the large gear ratio the power flow moves via the driving shaft 10, the sun gear 12, the large planetary gear 43, and pinion cage 41 via the internal toothing of gears 42 and the external toothing of gears 43 of sleeve 30 and from there, via the internal gears 31 to the external toothing of gears 21 and the toothing of output shaft 20. The little planetary gear 42 meshes with ring gear 71 which is inside of housing 70.

FIG. 3 shows a mid-range gear ratio. At this point, a gear shift sleeve 30 remains in the same position as in FIG. 2 during the high ratio as illustrated with switching step A. The piston cylinder unit 56, 57 is shifted into shift step C. With this, the driving shaft 10 is moved to such a fashion that sun gear 12 with the internal toothing of gears 61 of the ring gear 60 and from there meshes with the little planetary wheel 42 via the external toothing of gears 62. In the shifting position A, C the flow of force occurs via the driving shaft 10, the central gear 12, the ring gear 60, the planetary wheels 42, and the pinion cage 41 via the internal toothing of gears 47 to the external toothing of gears 33 of the gear shift sleeve and from there to the internal toothing of gears 31 and the external toothing of gears 21 of output shaft 20.

Not shown in these figures is the embodiment whereby instead of shift step B and C of the piston cylinder unit 56, 57, one shift step at a time is chosen for the piston cylinder units 54, 55 and 56, 57. The two step shift required for driving the input shaft is accomplished by shift fork rods which are located in a swiveling position on the end which is pointing away from axis I and has different lever arm ratios.

Some examples of planetary gear systems are found in the following U.S. patents which also have the assignee of the present inventor as assignee thereof. The various components of the following patents may be usable as components of the present invention: also the more detailed structure of at least some of these patents are as follows: U.S. Pat. No. 4,565,352 entitled "Winch Drive"; U.S. Patent No. 4,441,570 entitled "Connecting a Hub To The Drive of a Traction Chain Vehicle, or The Like"; U.S. Pat. No. 4,426,199 entitled "Rotary Fluid Actuated Machine"; U.S. Pat. No. 4,353,269 entitled "Ship's Transmission with Changeover from Cruising Speed to Slow Speed"; U.S. Pat. No. 4,311,066 entitled "Reduction Gear and Speed Control for Dredge Pumps"; U.S Pat. No. 4,309,914 entitled "Controlled Transmission System"; U.S. Pat. No. 4,304,152 entitled "Power and Torque Branching in a Planetary Gear System"; U.S. Pat. No. 4,173,906 entitled "Planetary Gear"; U.S. Pat. No. 4,106,366 entitled "Planetary Gear"; U.S. Pat. No. 3.958,465 entitled "Driving of a Shaft with Pendulum Mount"; U.S. Pat. No. 3,888,138 entitled "Planetary Drive System for Rolls in a Mill"; U.S. Pat. No. 3,885,656 entitled "Winch with Gearing and Brake Inside of a Closed Drum".

In summary, one feature of the invention resides broadly in a mechanically shiftable three speed planetary gear unit transmission with a central sun gear attached to the head of an input drive shaft as well as an external toothing of gears utilized as input members, and a gear shift sleeve which has internal toothing of gears as an output member of the first planetary gearing. The gear shift sleeve is movably and slidably attached axially to the output shaft by means of a shift linkage. The shift linkage protrudes from the housing, whereby the gear shift sleeve is connected, in a form locking manner to the input shaft. The gear shift sleeve is connected to the variable planetary gears and to the internal toothing gears. The pinion cage contains variable planetary gears and internal toothed gears. The gear shift sleeve is also connected to the external toothing gear with the pinion or planetary cage characterized by the following characteristics:

(a) one output shaft 20 is on the same axis I as the input shaft 10,
(b) an external toothing gear 21 is provided on output shaft 20 with which [toothing gear] gear shift sleeve 30 meshes axially in a slidable manner,
(c) input shaft 10 is axially movable by means of shifting arrangement 50,
(d) variable planetary gears 42, 43 with different diameters are provided on pinion cage 41,
(e) planetary gears 42 brace themselves against the inner toothed ring gear 71,
(f) the planetary gears 42 mesh with a sun gear ring 60, which has an inner gear tooth system 61, into which inner gear tooth system the gear tooth system of central wheel sun gear 12 engages.

Another feature of the invention resides broadly in planetary gearing characterized by the fact that gear shift sleeve 30 and driving shaft or input shaft 10 can be shifted by means of a shifting device 53 via the shift linkage 51, 52.

Yet another feature of the invention resides broadly in planetary gearing characterized by the fact that shifting device 53 is a multi-stage, pitch operating cylinder or adjustment cylinder.

A further feature of the invention resides broadly in planetary gearing characterized by the fact that the shifting device 53 consists of two hydraulic cylinders 54, 56 which are connected to each other.

A yet further feature of the invention resides broadly in planetary gearing characterized by the tact that the push rod 55 of the cylinder is embodied as a brace of shift step A (54).

Yet another further feature of the invention resides broadly in planetary gearing characterized by the fact that the cylinder 54 is attached to shift fork rods 51 which are connected to the gear shift sleeve 30.

An additional feature of the invention resides broadly in planetary gearing characterized by the fact that cylinders 54, 56 each, are connected near the bottom and the connecting rod 57, of the cylinder 56, is in contact with shift fork 52 of the input.

A yet additional feature of the invention resides broadly in planetary gearing characterized by the fact that cylinder 56 has an adjustment length which is larger than the distance between the middle of the gear wheel and the planetary gear wheel 42, 43.

A further additional feature of the invention resides broadly in planetary gearing characterized by the fact that cylinder 56 can be moved in at least two shift steps.

A yet further additional feature of the invention resides broadly in planetary gearing characterized by the fact that the piston rod 55 of cylinders 54 displays a length which, with full piston stroke volume, corresponds, at least, to the regulating distance of the gear shift sleeve 30.

Another further additional feature of the invention resides broadly in planetary gearing characterized by the fact that the shift linkages 51, 52 are located flexibly or swivelably on the end, which is pointing away from the axis I.

A yet another additional feature of the invention resides broadly in planetary gearing characterized by the fact that the shifting linkages 51, 52 display a variable relationship of the lever arms.

Another yet further feature of the invention resides broadly in planetary gearing characterized by the fact that the output shaft 20 is connected to a step-down gearing 80 which has an output shaft 22.

A still further feature of the invention resides broadly in planetary gearing characterized by the fact that step-down gearing 80 is a planetary gearing which is located in housing 70.

All, or substantially all, of the components and methods of the various embodiments may be used with at least one embodiment or all of the embodiments, if any, described herein.

All of the patents, patent applications, and publications recited herein, if any, are hereby incorporated by reference as if set forth in their entirety herein.

The invention as described hereinabove in the context of a preferred embodiment is not to be taken as limited to all of the provided details thereof, since modifications and variations thereof may be made without departing from the spirit and scope of the invention.

What is claimed is:

1. A mechanically shiftable three speed planetary gear transmission comprising:
 a housing;
 a driving shaft extending from the housing, said driving shaft having a head thereon within the housing;
 said head of said driving shaft having a first portion and a second portion, said first portion being attached to said driving shaft and said second portion being axially spaced apart from said first portion;
 a central toothed sun gear attached to said first portion of said head of said driving shaft;
 a toothed clutch gear attached to said second portion of said head of said drive shaft;
 an opposed axially spaced output shaft coaxial with said driving shaft, said output shaft having external gear teeth provided thereon within the housing;

a gear shift sleeve slideably mounted for axial movement along the output shaft;

said gear shift sleeve having a first set of gear teeth for engagement with the external gear teeth of the output shaft and a second set of gear teeth for engagement with said toothed clutch gear;

a shift device protruding from the housing, and locked to said driving shaft for axially moving said driving shaft, engaged with said gear shift sleeve for sliding the same;

a pinion cage containing variable planetary gears having different diameters;

an internal toothed ring gear in the housing with which one of said planetary gears mesh; and an internally and externally toothed ring gear concentric with said central sun gear and selectively engageable with said planetary gears and said central sun gear.

2. A mechanically shiftable three speed planetary gear transmission as defined in claim 1, wherein said shift device comprises a shift linkage which engages with a peripheral slot in the shift sleeve and with a peripheral slot in the driving shaft for axial sliding movement thereof.

3. A mechanically shiftable three speed planetary gear transmission as defined in claim 2, wherein said shift device includes adjustable piston cylinder units.

4. A mechanically shiftable three speed planetary gear transmission as defined in claim 3, wherein said piston cylinder units comprise a pair of connected hydraulic cylinders, each having a piston and piston rod.

5. A mechanically shiftable three speed planetary gear transmission as defined in claim 4, wherein said shift device includes a sleeve shift fork rod connected to said gear shift sleeve and a piston rod of one of said pair of cylinders is attached to said sleeve shift fork rod.

6. A mechanically shiftable three speed planetary gear transmission as defined in claim 5, wherein said shift device includes a shaft shift fork rod connected to said driving shaft and the piston rod of the other of said pair of cylinders is attached to said shaft shift fork rod.

7. A mechanically shiftable three speed planetary gear transmission as defined in claim 6, wherein the cylinder containing the piston rod attached to said shaft shift fork rod is constructed such that the displacement of the piston rod is of a length greater than the axial distance between the middle of the central toothed sun gear and the planetary gears.

8. A mechanically shiftable three speed planetary gear transmission as defined in claim 7, wherein said central toothed sun gear is alternately axially to engage planetary gears of different diameters.

9. A mechanically shiftable three speed planetary gear transmission comprising:

a housing;

a driving shaft extending from the housing, said driving shaft having a peripheral slot therein, and head thereon within the housing;

said head of said driving shaft having a first portion and a second portion, said first portion being attached to said driving shaft and said second portion being axially spaced apart from said first portion;

a central toothed sun gear attached to said first portion of said head of said driving shaft;

a toothed clutch gear attached to said second portion of said head of said drive shaft;

an opposed axially spaced output shaft coaxial with said driving shaft, said output shaft having external gear teeth provided thereon within the housing;

a gear shift sleeve slideably mounted for axial movement along said output shaft;

said gear shift sleeve having a peripheral slot therein, a first set of gear teeth engageable with the external gear teeth of the output shaft and a second set of gear teeth engageable with said toothed clutch gear;

a shift device protruding from the housing, including adjustable piston cylinder units, having a shift linkage, which engages with the peripheral slot in the driving shaft and the peripheral slot in the shift sleeve for axially slidably moving of the same;

a pinion cage containing variable planetary gears having different diameters;

an internal toothed ring gear in the housing with which one of said planetary gears mesh; and an internally and externally toothed ring gear concentric with said central sun gear and selectively engageable with said planetary gears and said central sun gear.

10. A mechanically shiftable three speed planetary gear transmission as defined in claim 9, wherein said piston cylinder units comprise a pair of connected hydraulic device includes a sleeve shift fork rod connected to said gear shift sleeve at the slot therein and a piston rod of one of said pair of cylinders, and a shaft shift rod connected to said driving shaft at the slot therein and a piston rod of the other of said cylinders.

* * * * *

UNITED STATES PATENT AND TRADEMARK OFFICE
CERTIFICATE OF CORRECTION

PATENT NO. : 4,995,861

DATED : February 26, 1991

INVENTOR(S) : Peter ERLBRUCH

It is certified that error appears in the above-identified patent and that said Letters Patent is hereby corrected as shown below:

In column 1, lines 9 & 10, delete "2" after transmission and before Description, insert --2.--.

In column 1, line 66, after 'gearing', delete --,--.

In Claim 8, line 3, after 'alternately', insert --displaceable--.

Signed and Sealed this

First Day of September, 1992

Attest:

DOUGLAS B. COMER

Attesting Officer

Acting Commissioner of Patents and Trademarks